R. B. EWING.
Machine for Placing Elastic Tubing upon Shafts or Spindles.
No. 216,263. Patented June 10, 1879.
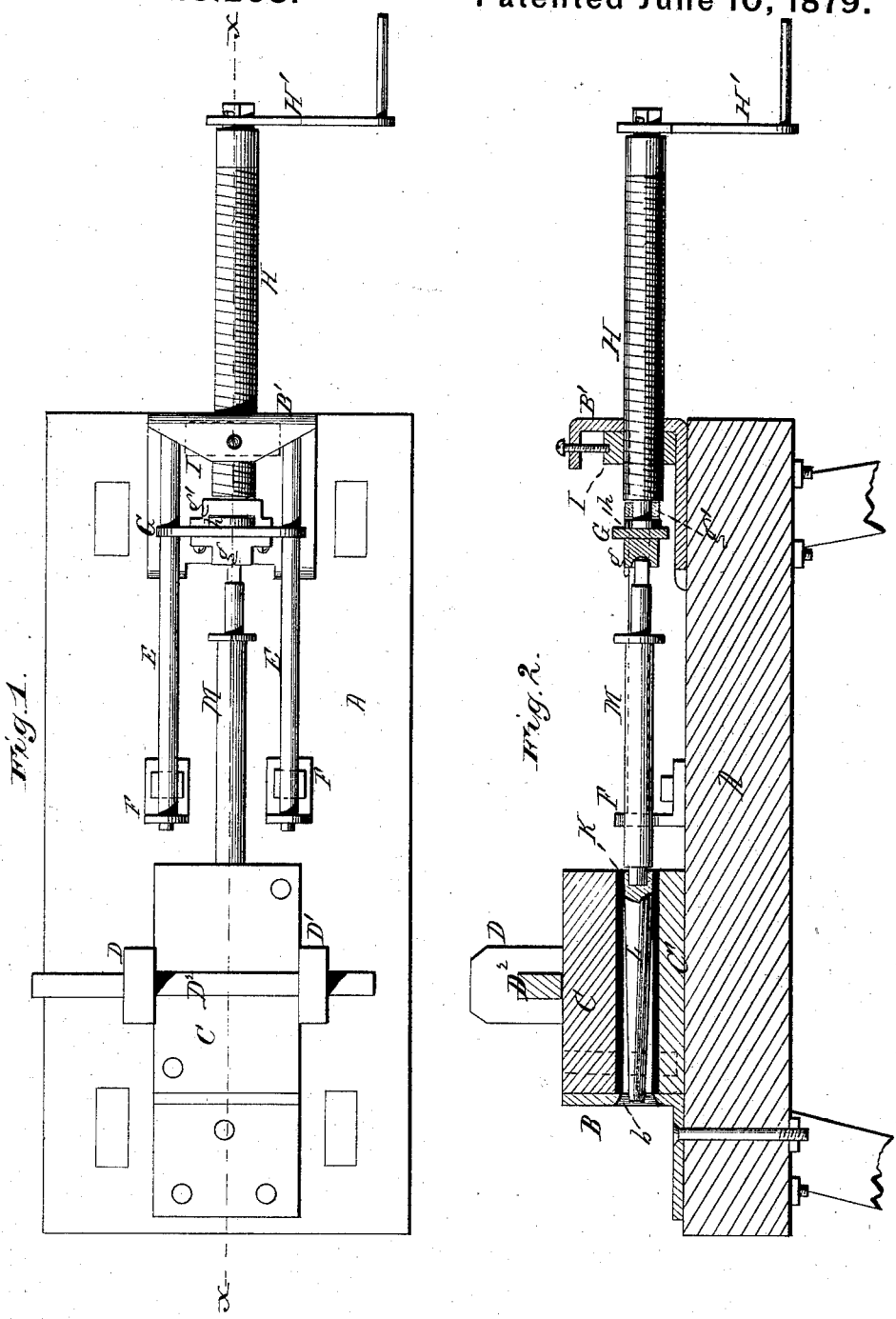

UNITED STATES PATENT OFFICE.

RUFUS B. EWING, OF NEWARK, OHIO.

IMPROVEMENT IN MACHINES FOR PLACING ELASTIC TUBING UPON SHAFTS OR SPINDLES.

Specification forming part of Letters Patent No. 216,263, dated June 10, 1879; application filed April 26, 1879.

*To all whom it may concern:*

Be it known that I, RUFUS B. EWING, of Newark, county of Licking, State of Ohio, have invented certain new and useful Improvements in Machines for Placing Elastic Tubing upon Shafts or Spindles, of which the following is a full, clear, and exact description, reference being had to the accompanying drawings, making part of this specification, in which—

Figure 1 is a plan or top view of my improved machine or apparatus; and Fig. 2 is a longitudinal section through the same, taken on line $x\ x$, Fig. 1.

Similar letters of reference denote corresponding parts in both figures.

In the process of placing elastic tubing upon shafts or spindles, as heretofore practiced, it has been customary, so far as I am acquainted with the devices employed, to use a tapering hollow mandrel, within which the rod or shaft to be covered by the elastic tubing was placed, and which was drawn through the tubing, expanding it and leaving the shaft after it had been drawn into the tubing to the required point to be deposited therein. This process, from the fact that the hollow mandrel had to be large enough to inclose the rod or shaft on which the tubing was to be placed, produced an expansion of the tubing greatly beyond what was necessary for the reception of the shaft, rendering it necessary to use a tubing of greater diameter than would otherwise have been necessary for the shaft in order to get the mandrel through it, and this resulted frequently in leaving the tubing loose upon or imperfectly secured to the shaft.

The object of my improvement is to overcome this difficulty, and at the same time to simplify the mechanism for placing elastic tubing upon shafts.

The invention consists in the employment of the rod or shaft upon which the elastic tubing is to be placed as a follower, in combination with a tapering mandrel for opening or expanding the tubing to the size or diameter of the shaft, the latter forcing the tapering mandrel or opener through until it reaches its required relation to and is covered by the tubing, as hereinafter explained.

In the accompanying drawings, A represents a strong frame or table, upon which my improved apparatus is mounted. B is a stout upright metal plate secured through a foot-piece or base-plate at or near one end thereof, and provided with a central perforation, $b$, conforming in diameter to the size of the shafts upon which the tubing is to be placed and to the internal diameter of the tubing, and forming an abutment, against which the tubing rests, and by means of which it is held against end-thrust.

In front of the plate B, and abutting against it, is a divided block, C C', having a central longitudinal perforation of a diameter equal to the external diameter of the elastic tubing, and conforming in outline thereto. This divided block is of a length equal, or about equal, to the length of the pieces of tubing to be operated upon, being intended to snugly inclose and prevent the doubling up, and also any undue expansion of the same, and is secured in place on the table between two uprights, D D¹, mortised or perforated near their upper ends to receive a wedge-shaped key, D², for clamping the two parts of the divided block firmly together and to the table.

E E are parallel bars or ways, secured at one end in uprights F, arranged at or near midway the length of the bed-plate or table A, and at their opposite ends in a strong upright plate or standard, B', arranged at the end of the bed-plate opposite to standard B.

G is a cross-head moving on the bars or ways E, and provided on its forward face with a block, $g$, having a centering-socket formed in it to receive the shank end of the shaft to be covered, as hereinafter explained.

The block or cross-head G on its opposite face is secured to the end of a screw, H, by means of a collar, $h$, formed on or secured to the shaft, and an angular or socketed bracket, $g'$, secured to the cross-head, and grasping the collar $h$ in such manner that the cross-head will move back and forth with the screw. The screw H passes through a nut, I, which may either be formed in or attached to the standard B', as preferred.

Motion is imparted to the screw for moving it, and with it the cross-head G, in and out by a crank, H', or other suitable means, as preferred.

K represents a length or section of elastic tubing secured in place in the divided block C C'; L, the tapering mandrel for expanding said tubing and opening the way for the shaft M, upon which the tubing is to be placed and secured. This mandrel L is made to taper from its rear end, where it conforms to the size of the shaft M, to its forward end, where it is sufficiently reduced in size to adapt it to readily pass through the tubing. The rear larger end of the mandrel has a socket formed in it for the reception of the journal of the shaft or rod M, thereby permitting the latter to abut directly and snugly against, and thus to closely follow, the mandrel in its passage through the elastic tube.

The parts being secured in place with the small end of the mandrel inserted in the tube K, the journal of the shaft placed in the socket in the larger end of said mandrel, and the crank or opposite end of said shaft placed in the centering-socket $g$ on the cross-head G, as shown in Fig. 2, the screw H is rotated, moving the cross-head G forward, and with it the shaft M, causing the latter to force the tapering mandrel forward to open up the tube, the shaft following it closely through the tube until the mandrel is forced out through the perforation $b$ in the standard B and the shaft is driven snugly into place in the tube.

By the arrangement described all unnecessary expansion of the elastic tubing is avoided, and the use of a smaller tubing, as compared with those applied by other means referred to, is rendered practicable.

Another advantage resulting from the arrangement described is, that the tube, instead of being drawn out or lengthened in the process of placing it on the roller, is compressed and shortened and thickened by the end-thrust exerted upon it, and it has been found in practice that a piece of tubing longer than the shaft itself can be compressed upon and thus made to snugly fit and grasp the shaft, thus giving it a stronger hold upon the shaft and making it more durable than when applied by a different process, as above explained.

After the shaft has been inserted, as above described, the cross-head is backed off to permit the introduction of another shaft, the upper half of the divided block C C' removed to permit the removal of the covered shaft and a new piece of tubing to be inserted, when the operation is repeated as before.

Having now described my invention, I claim—

1. In a machine or apparatus for placing elastic tubing upon rolls or spindles, a tapering mandrel for opening or expanding the tubing, in combination with the shaft or roll upon which the tubing is to be secured, arranged to follow said mandrel and force it through the tubing, substantially as described.

2. The reciprocating cross-head G, in combination with the mechanism for actuating said cross-head and forcing the tapering mandrel and the following shaft through the tubing, substantially as described.

3. The cross-head G, moving on suitable ways, and the screw H for actuating the same, in combination with the holding-block C C' and tapering mandrel K, arranged and operating substantially as described.

RUFUS B. EWING.

Witnesses:
EVAN J. EVANS,
OWEN DORSEY.